US012579659B1

(12) United States Patent
Chen

(10) Patent No.: US 12,579,659 B1
(45) Date of Patent: Mar. 17, 2026

(54) CAMERA AND RADAR-BASED THREAT MONITORING FOR MICROMOBILITY PLATFORMS

(71) Applicant: Lumen Labs (HK) Limited, Hong Kong (CN)

(72) Inventor: Haoran Chen, Hong Kong (CN)

(73) Assignee: Lumen Labs (HK) Limited, Hong Kong (CN)

( * ) Notice: Subject to any disclaimer, the term of this patent is extended or adjusted under 35 U.S.C. 154(b) by 0 days.

(21) Appl. No.: 19/247,486

(22) Filed: Jun. 24, 2025

(51) Int. Cl.
*G06T 7/20* (2017.01)
*B60K 35/23* (2024.01)
(Continued)

(52) U.S. Cl.
CPC ................ *G06T 7/20* (2013.01); *B60K 35/23* (2024.01); *G01S 13/867* (2013.01); *G01S 13/931* (2013.01); *G06V 20/58* (2022.01); *B60K 2360/167* (2024.01); *B60K 2360/177* (2024.01); *G06T 2207/10028* (2013.01); *G06T 2207/20081* (2013.01); *G06T 2207/30236* (2013.01); *G06T 2207/30252* (2013.01)

(58) Field of Classification Search
CPC ............. G06T 7/20; G06T 2207/10028; G06T 2207/20081; G06T 2207/30236; G06T 2207/30252; B60K 35/23; B60K 2360/167; B60K 2360/177; G01S 13/867; G01S 13/931; G06V 20/58
See application file for complete search history.

(56) References Cited

U.S. PATENT DOCUMENTS

| 11,772,673 | B2 * | 10/2023 | Yonushonis | .......... | G08G 1/164 |
| | | | | | 701/301 |
| 11,912,369 | B2 | 2/2024 | Trehan | | |

(Continued)

FOREIGN PATENT DOCUMENTS

WO          2023/205444 A1      10/2023

OTHER PUBLICATIONS

Solus et al., "IoT-Enabled Smart Bike Helmet with an AI-Driven Collision Avoidance System", DOI: 10.1109/eIT57321.2023. 10187299, May 2023, 06 pages.

*Primary Examiner* — Tom Y Lu
(74) *Attorney, Agent, or Firm* — Squire Patton Boggs (US) LLP; Michael W. Lew

(57) ABSTRACT

Embodiments described herein provide systems and methods for threat detection for micromobility platforms based on image and range data. An example method generally includes capturing image data from a first sensor and corresponding ranging data from a second sensor communicatively coupled with a processing system, all mounted on a micromobility platform; identifying, based on an object detection machine learning model and the image data, one or more objects to monitor; predicting, based on processing the image data and the corresponding ranging data through a machine learning model, future motion of the identified one or more objects; determining that a threatening object from the identified one or more objects is a collision threat to the micromobility platform; and recording subsequent image data from the first sensor based on the determination until the machine learning model determines that the threatening object is no longer a collision threat has elapsed.

17 Claims, 4 Drawing Sheets

(51) Int. Cl.
  *G01S 13/86* (2006.01)
  *G01S 13/931* (2020.01)
  *G06V 20/58* (2022.01)

(56) References Cited

U.S. PATENT DOCUMENTS

| | | | |
|---|---|---|---|
| 12,051,250 B2 | 7/2024 | Medower et al. | |
| 2022/0319198 A1* | 10/2022 | Yasui | G06V 10/774 |
| 2023/0278544 A1* | 9/2023 | Wendt | B62J 27/00 |
| | | | 701/1 |
| 2024/0185717 A1 | 6/2024 | Wendt et al. | |
| 2025/0143399 A1 | 5/2025 | Jain et al. | |
| 2025/0166482 A1 | 5/2025 | Sundaram et al. | |

* cited by examiner

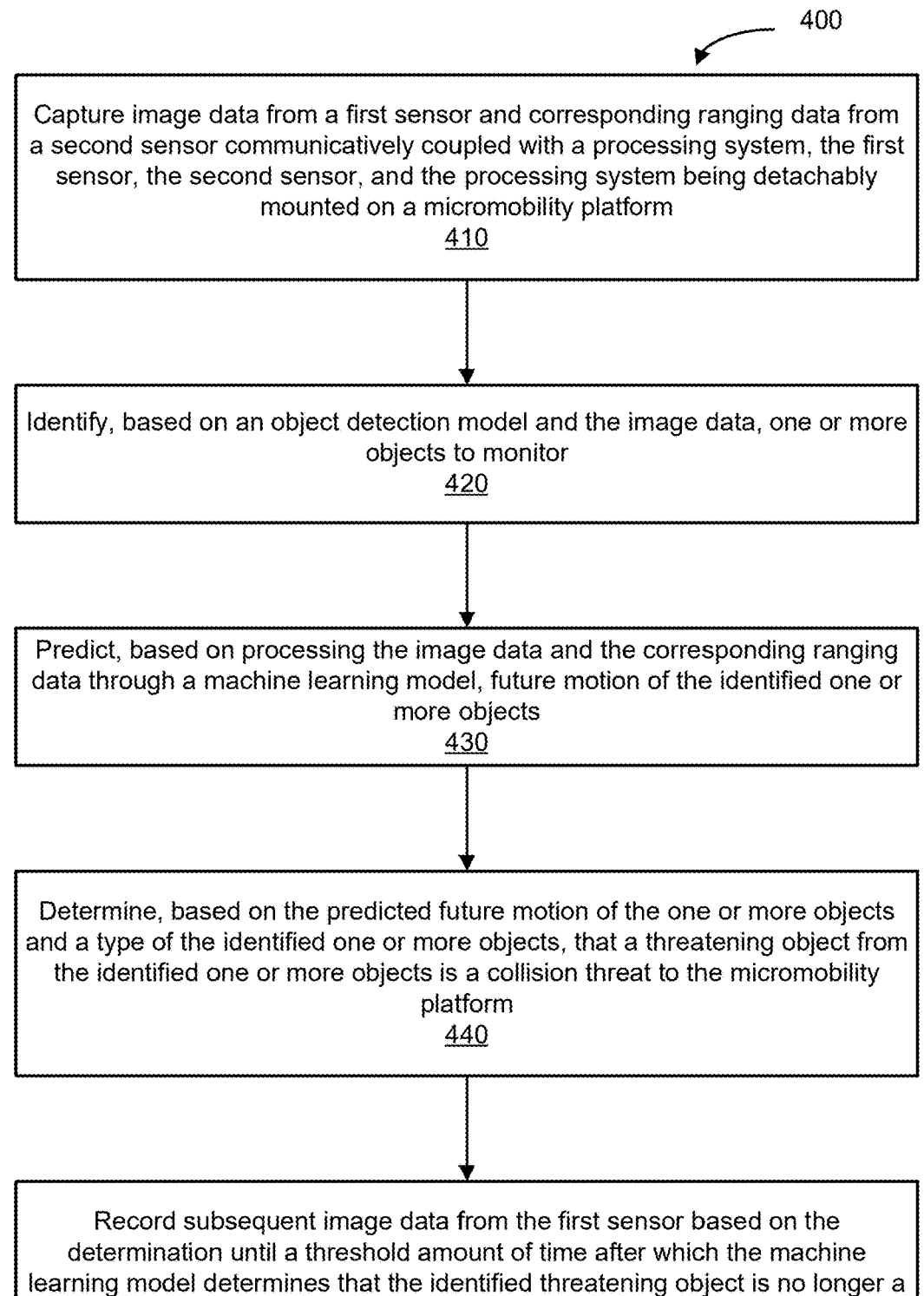

400

Capture image data from a first sensor and corresponding ranging data from a second sensor communicatively coupled with a processing system, the first sensor, the second sensor, and the processing system being detachably mounted on a micromobility platform
410

Identify, based on an object detection model and the image data, one or more objects to monitor
420

Predict, based on processing the image data and the corresponding ranging data through a machine learning model, future motion of the identified one or more objects
430

Determine, based on the predicted future motion of the one or more objects and a type of the identified one or more objects, that a threatening object from the identified one or more objects is a collision threat to the micromobility platform
440

Record subsequent image data from the first sensor based on the determination until a threshold amount of time after which the machine learning model determines that the identified threatening object is no longer a collision threat has elapsed
450

FIG. 4

CAMERA AND RADAR-BASED THREAT MONITORING FOR MICROMOBILITY PLATFORMS

BACKGROUND

Field of the Various Embodiments

Embodiments of the present disclosure relate generally to micromobility platforms and, more specifically, to techniques for using imaging and ranging data and artificial intelligence models to detect threats to micromobility platforms in motion.

Description of the Related Art

Micromobility platforms are generally small, low-speed vehicles that are used as a mode of transportation. These platforms may be human or electric powered and may include, for example, bicycles, scooters, electric-assist bicycles (e-bikes), electric-assist scooters (e-scooters), and other vehicles that are smaller and have less motive power than larger mobility platforms, such as motor vehicles. Micromobility platforms are increasing in popularity as a transportation option for many users, especially in cities or other densely populated areas where shared fleets of micromobility platforms provide users with on-demand access to transportation.

Due to the size of micromobility platforms, safety is a risk for users of micromobility platforms. For example, micromobility platforms are generally unenclosed vehicles that lack the protection of an enclosed vehicle (e.g., a roll cage, crush zones, and other active and passive safety restraint systems of a motor vehicle). Because micromobility platforms are operated on the same roads as other larger vehicles, micromobility platforms and the users of these platforms are generally at risk of collision with significantly larger vehicles. In a collision between a micromobility platform and a larger motor vehicle, the user of the micromobility platform may thus be at significant risk of bodily harm, as the only protection that the micromobility platform may have against other threats may be the user's clothing and a helmet.

To address collision threats during operation of a motor vehicle, various monitoring and control techniques have been developed for a motor vehicle. For example, motor vehicles may include various autonomous driving and steering (ADAS) systems that are designed to control the steering and motive (e.g., accelerator and brake) inputs that dictate the direction and speed of travel of the vehicle. Generally, however, these systems involve the use of computing devices with significant computing power that may be unavailable to micromobility platforms due to the size and power requirements involved in deploying such computing devices for use on a vehicle. Further, while various alerting systems may be added to micromobility platforms, such alerting systems may not provide fine-grained detail about whether an object is a threat to the micromobility platform.

As the foregoing illustrates, what is needed in the art are improved techniques for identifying threats to micromobility platforms and taking actions based on identifying these threats to micromobility platforms.

SUMMARY

One embodiment of the present invention sets forth a technique for detecting threats to micromobility platforms using artificial intelligence models and imaging and ranging data, the computer-implemented method comprising capturing image data from a first sensor and corresponding ranging data from a second sensor communicatively coupled with a processing system, the first sensor, the second sensor, and the processing system being mounted on a micromobility platform; identifying, based on an object detection machine learning model and the image data, one or more objects to monitor; predicting, based on processing the image data and the corresponding ranging data through a machine learning model, future motion of the identified one or more objects; determining, based on the predicted future motion of the identified one or more objects and a type of the identified one or more objects, that a threatening object from the identified one or more objects is a collision threat to the micromobility platform; and recording subsequent image data from the first sensor based on the determination until a threshold amount of time after which the machine learning model determines that the threatening object is no longer a collision threat has elapsed.

One technical advantage of the disclosed techniques relative to the prior art is that the disclosed techniques are operable to efficiently detect threats to a micromobility platform using a fusion of imaging data and ranging data. In detecting threats to a micromobility platform, the micromobility platform may use sensors mounted to the micromobility platform to identify (1) objects that are a potential threat to the micromobility platform and (2) predict whether an object is a potential threat based on a predicted path of motion of the identified objects. By doing so, embodiments of the present disclosure may improve the safety of micromobility platforms by providing rich threat data to a user of a micromobility platform. Further, because embodiments of the present disclosure can identify potential threats to a micromobility platform using computationally efficient techniques, embodiments of the present disclosure may allow for low power computing devices to perform threat detection for a micromobility platform and need not involve the use of large scale computing devices that may not be feasible to deploy on or in conjunction with (e.g., a cloud computing instance) a micromobility platform to perform real-time threat detection and recording. These technical advantages provide one or more improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 4 illustrates example operations for efficiently detecting threats to a micromobility platform based on a fusion of imaging and ranging data, according to some embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

Figure 1:
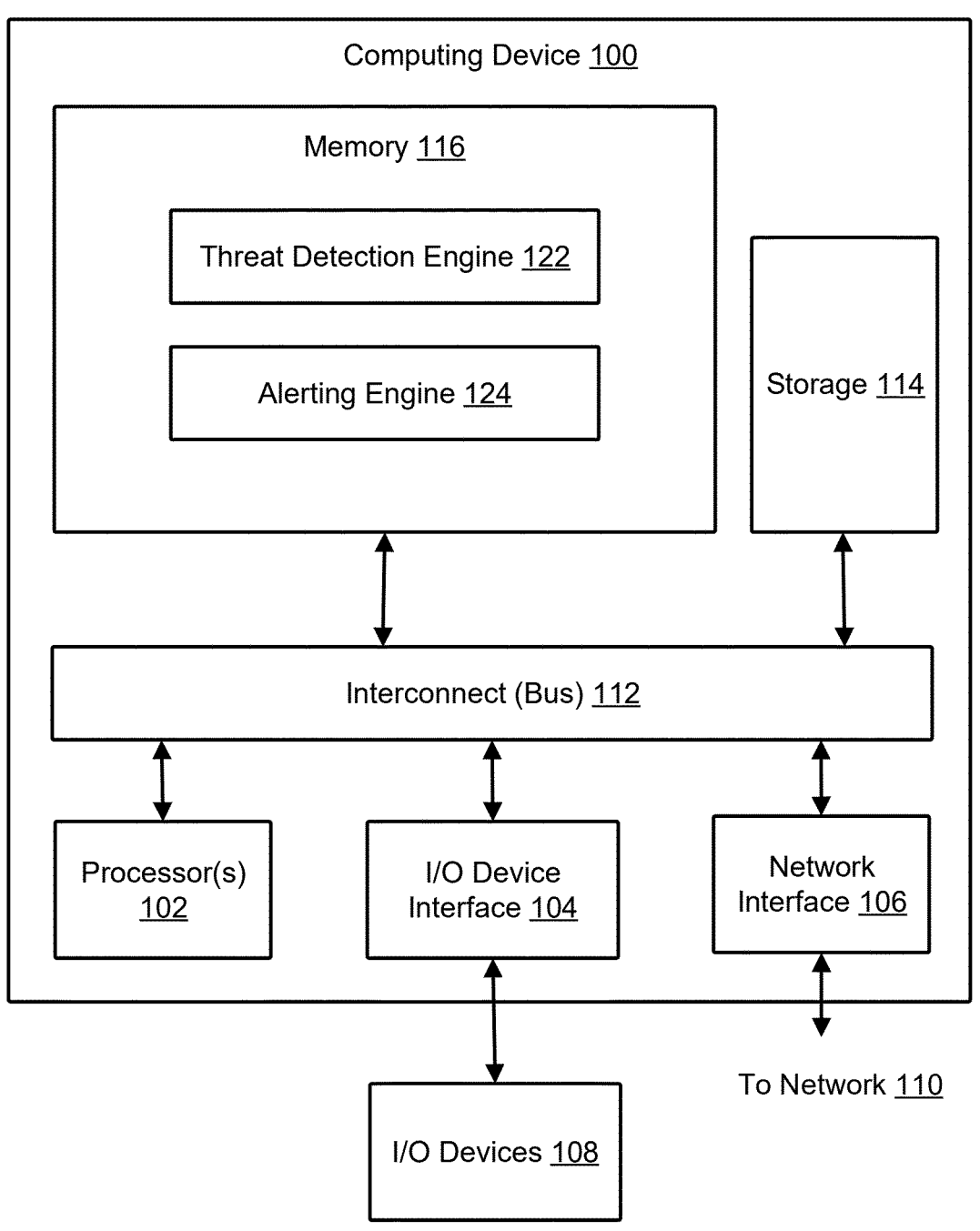
FIG. 1 illustrates a computer system configured to implement one or more aspects of various embodiments of the present invention.

FIG. 1 illustrates a computing device 100 configured to implement one or more aspects of various embodiments of the present invention. In one embodiment, computing device 100 includes a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run a threat detection engine 122 and an alerting engine 124 that reside in a memory 116.

It is noted that the computing device described herein is illustrative and that any other technically feasible configurations fall within the scope of the present disclosure. For example, multiple instances of training engine 122 or inference engine 124 could execute on a set of nodes in a distributed and/or cloud computing system to implement the functionality of computing device 100. In another example, training engine 122 or inference engine 124 could execute on various sets of hardware, types of devices, or environments to adapt training engine 122 or inference engine 124 to different use cases or applications. In a third example, training engine 122 or inference engine 124 could execute on different computing devices and/or different sets of computing devices.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

I/O devices 108 include devices capable of providing input, such as a keyboard, a mouse, a touch-sensitive screen, a microphone, and so forth, as well as devices capable of providing output, such as a display device or speaker. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 is any technically feasible type of communications network that allows data to be exchanged between computing device 100 and external entities or devices, such as a web server or another networked computing device. For example, network 110 may include a wide area network (WAN), a local area network (LAN), a wireless (Wi-Fi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Training engine 122 and inference engine 124 may be stored in storage 114 and loaded into memory 116 when executed.

Memory 116 includes a random-access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including training engine 122 or inference engine 124.

Figure 2:
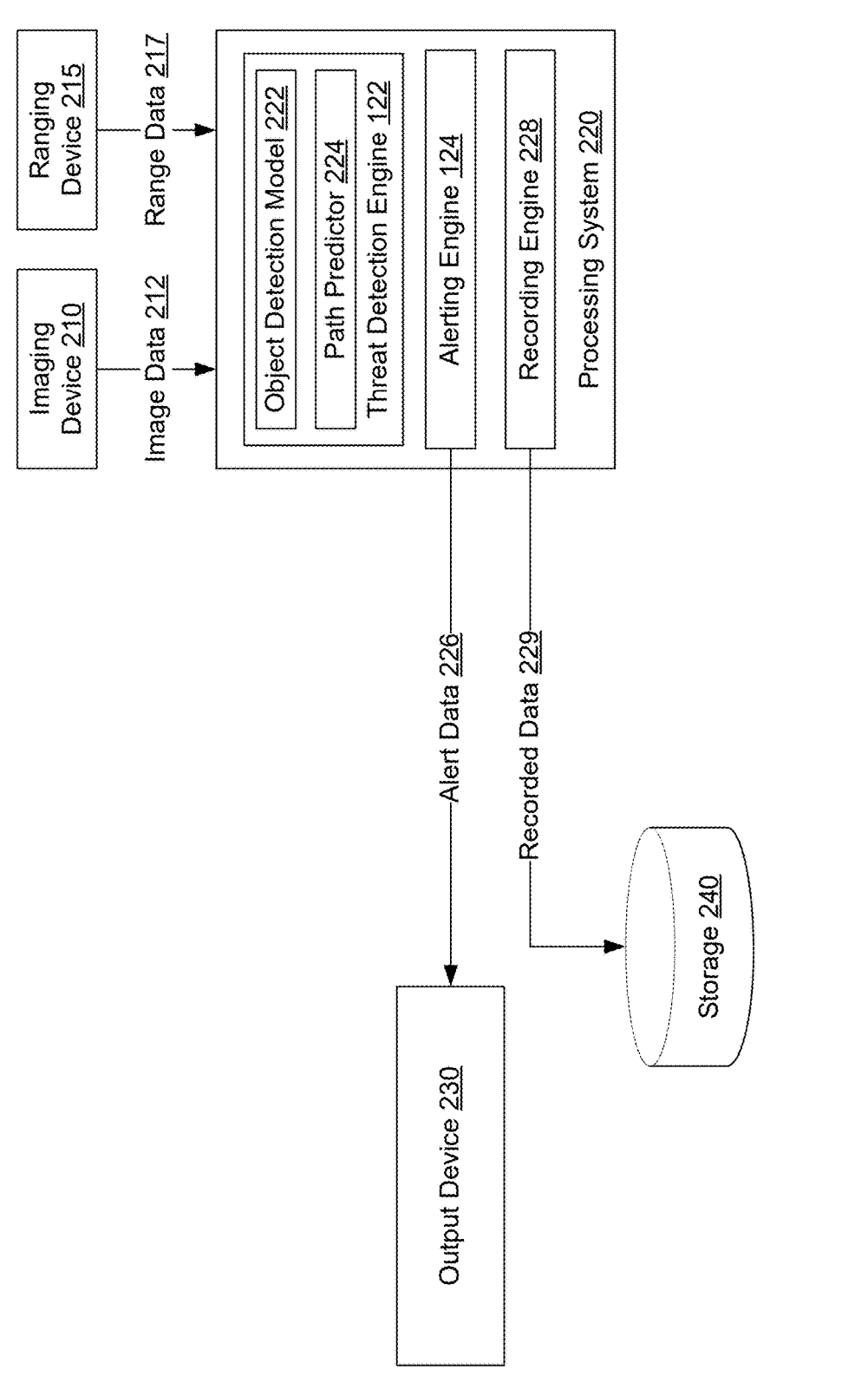
FIG. 2 illustrates an example deployment of alerting systems, processing systems, and input sensors for threat detection on a micromobility platform, according to some embodiments.

FIG. 2 illustrates an example deployment 200 of alerting systems, processing systems, and input sensors for threat detection on a micromobility platform, according to some embodiments. In deployment 200, the input sensors (which may include an imaging device 210 and a ranging device 215, amongst other input sensors that can be used to detect objects in an environment), processing system 220, output device 230, and/or storage 240 may be detachably or permanently coupled to a micromobility platform and may be communicatively coupled (e.g., via wired or wireless connections, such as a cellular connection, a wireless local area network connection (e.g., a Wi-Fi network), a Bluetooth connection, etc.) with each other. For example, the imaging device 210, ranging device 215, processing system 220, output device 230, and storage 240 may be deployed as a single or multiple packages that are coupled to a structural member of a micromobility platform, such as the seat post of a bicycle or e-bicycle, a riding platform of a scooter or e-scooter, or the like. Further, in some embodiments, imaging device 210, ranging device, processing system 220, and storage 240 may be packaged in a first package that is detachably or permanently coupled to a structural member of the micromobility platform, and output device 230 may be packaged in a second package that is communicatively coupled with the first package and worn by a user of the micromobility platform (e.g., an augmented reality headset or helmet) or coupled to another structural member of the micromobility platform (e.g., a display device detachably coupled to the handlebars of a bicycle or e-bicycle). It should also be recognized that while a single imaging device 210, ranging device 215, and output device 230 are illustrated in FIG. 2, any number of imaging devices 210 and ranging devices 215 may provide image data 212 and range data 217 to processing system 220, and processing system 220 may output alert data 226 to any number of output devices 230 in any of a plurality of modalities (e.g., visual alerts, audio alerts, haptic alerts, or the like).

Imaging device 210 may be a camera or other image capture device that captures image data 212 as a stream of images provided to processing system 220 for processing. Ranging device 215 may be any of a variety of devices that capture range data 217 relative to a reference plane for objects in a field of view defined for the ranging device 215. Ranging device 215 may, for example, be an ultrasonic sensor or array of ultrasonic sensors, a radar using any of a variety of detection frequencies (e.g., millimeter wave, such as Ka band radar, Ku band radar; larger bandwidth ranging devices using centimeter wave frequencies, etc.), a LIDAR (light detection and ranging) devices, or the like. Generally, the image data 212 may be captured with the same or similar field of view as the range data 217 so that objects in image data 212 can be correlated with corresponding range information (e.g., distance of an object from a reference plane) in range data 217 for use in identifying potentially threatening objects to a micromobility platform and predicting a path of travel of these potentially threating objects.

In some embodiments, image data 212 and range data 217 may be captured at a first periodicity and first resolution when objects are not detected in the field of view of imaging device 210 and/or ranging device 215. The first periodicity and first resolution may be defined as a low periodicity and low resolution that provides sufficient detail for threat detection engine 122 to determine whether there are objects in the field of view of image data 212 and range data 217 and predict a path of travel of these objects to determine whether there are any objects that are a potential collision threat to the micromobility platform. When threat detection engine 122 determines that an object in the field of view of imaging device 210 and/or ranging device 215 is a potential collision threat to the micromobility platform, image device 210 and ranging device 215 may be configured to capture image data 212 and range data 217, respectively, at a second periodicity and second resolution. The second periodicity may allow for more frequent data capture than the first periodicity. Meanwhile, the second resolution may allow for higher resolution data to be recorded (e.g., as recorded image data 229, as discussed in further detail below) and committed to storage 240. For example, the first resolution may be a relatively low resolution, such as 480p (e.g., 640 by 480 pixels) or 720p (e.g., 1280 by 720 pixels), while the second resolution may be a higher resolution that captures detail more clearly, such as 1080p (e.g., 1920 by 1080 pixels), 2K (e.g., 2560 by 1440 pixels), or 4K (e.g., 3840 by 2160 pixels). Generally, because higher periodicity and higher resolution may impose higher power draw and computational processing requirements on processing system 220, imaging device 210 and ranging device 215 may be configured to attempt to maximize the amount of time at which image data 212 and range data 217 is recorded at the first periodicity and first resolution.

As illustrated, image data 212 and range data 217 is input into processing system 220 for processing to identify objects in a field of view of the imaging device 210 and ranging device 215 and to determine whether any of the identified objects are potential collision threats to the micromobility platform on which processing system 220 is mounted. To do so, image data 212 may be input into object detection model 222 for processing. Generally, object detection model 222 may be a machine learning model trained to detect instances of objects in a scene captured in image data 212. In detecting instances of objects in a scene, object detection model 222 may be trained to recognize objects that are likely to be collision threats to a micromobility platform that may severely injure a user of the micromobility platform in the event of a collision. For example, object detection model 222 may be a computer vision model that is trained to detect motor vehicles such as cars, sport utility vehicles, light-duty (pickup) trucks, cargo vans, medium-duty trucks, and the like; motorcycles or other two-wheeled vehicles; all-terrain vehicles; three-wheeled motorcycles, or the like. Because, for example, birds or aeroplanes are not likely to be a collision threat to a user of a micromobility platform, object detection model 222 may not be trained to identify these objects in image data 212. Generally, when object detection model 222 detects an object of interest in image data 212, object detection model 222 can generate a bounding box around the object defining an area in the image data 212 at which the object is located.

Threat detection engine 122 can correlate the locations of objects in the image data 212 with range data 217 to assign a distance from a reference plane to each object detected by object detection model 222. To do so, because range data 217 may include a plurality of point clusters corresponding to the locations of different objects in a scene captured in image data 212, threat detection engine 122 can attempt to match the locations of point clusters in range data 217 with the locations of objects in image data 212. The matching may be performed, for example, using various techniques such as Hungarian matching techniques in which threat detection engine 122 attempts to assign point clusters to objects based on solving a combinatorial problem or other matching techniques. Based on the correlation between the locations of objects in the image data 212 and the locations of corresponding point clusters in the range data 217, threat detection engine 122 can identify objects and their distances from a reference plane (e.g., the back of a micromobility platform) for any given frame received from imaging device 210.

To determine whether an object is a potential collision threat to the micromobility platform on which processing system 220 is mounted, path predictor 224 uses sequences of image data 212 and the objects and distances associated with the objects in the image data 212 to calculate velocities and predict paths of travel for these objects. Generally, based on the distance associated with an object across different frames, path predictor 224 can determine the velocity of an object over time. In some embodiments, path predictor 224 can determine that an object is a potential collision threat to the micromobility platform based on a closing speed, or difference in distance over time, of an object. If the closing speed of the object exceeds a threshold closing speed, path predictor 224 can determine that the object is a potential collision threat to the micromobility platform and can take one or more actions to either further track the path of the object or instruct alerting engine 124 to generate an alert for a user of the micromobility platform.

In some embodiments, path predictor 224 can determine that an object is a potential collision threat to the micromobility platform on which processing system 220 is detachably mounted based on the location of an object across different frames of image data 212 and the distance of the object from a reference plane. To do so, path predictor 224 can identify a vanishing point in image data 212 based on which path predictions or calculations can be performed. The vanishing point may be determined, for example, as a point in the image data 212 at which parallel lines detected in image data 212 (e.g., broken or solid road lines) converge on a single point. Based on the vanishing point, path predictor 224 can generate vectors associated with each object of interest detected in the image data 212. A vector associated with an object detected in the image data 212 may start from the vanishing point and terminate at a defined point associated with a bounding box for the object (e.g., a centroid or other center point in the bounding box, a defined point on an edge of the bounding box (e.g., the center of the top edge of the bounding box, where the bottom of an image correlates to space that is closer to a reference plane for the micromobility platform and the top of the image correlates to an infinity focus point for the micromobility platform).

Across frames, path predictor 224 can use the terminating point associated with an object to determine whether a path of travel of the object constitutes a potential threat to the micromobility platform. In some embodiments, the location of the terminating point in image data 212, along with distance and velocity information derived from range data 217, can be used to predict a future location of the object using a machine learning model trained to predict the path of travel of an object based on prior time-series data associated with the location and velocity of the object. If the predicted path of travel indicates that the trajectory of the object will intersect with the micromobility platform within a threshold amount of time, path predictor 224 can determine that the object is a collision threat to the micromobility platform and provide information about the object to alerting engine 124. In some embodiments, the vector associated with an object for the current frame of image data 212 and the distance associated with the object may be used to determine that an object is a potential collision threat to the micromobility platform. In such a case, a horizontal region in the image data 212 may be defined as a region of interest for the micromobility platform. If the vector from the defined vanishing point associated with an object points towards a point in the horizontal region in the image data 212 and the measured distance to the object from range data 217 is within a threshold distance from a reference plane, path predictor 224 can determine that the object is a potential collision threat to the micromobility platform.

In some embodiments, path predictor 224 may be configured to classify objects into different threat categories based on historical distance and location information associated with an object and derived from the image data 212 and range data 217. For example, path predictor 224 can classify an object as a severe collision risk to the micromobility platform based on a level of aggression displayed by an object. The level of aggression may be, for example, determined based on information such as a closing speed, level of erraticism in the path taken by the object, or the like; high closing speeds or highly erratic paths may serve as an indication that an object is a severe or imminent collision threat to the micromobility platform. Meanwhile, lower closing speeds or consistent paths taken by an object may serve as an indication that an object is a less severe or imminent collision threat to the micromobility platform.

In some embodiments, path predictor 224 may be configured to determine whether an object is a potential collision threat to the micromobility platform based on a tilt angle of the micromobility platform relative to a reference plane. To determine the tilt angle, various sensing devices (e.g., gyroscopes, image sensors, etc.) can be used. The tilt angle may be determined relative to a banking angle of the road surface on which the micromobility platform is traveling. Based on the tilt angle, a relative position of the threating object and the micromobility platform can be determined. For example, the determination of the relative position of the threating object to the micromobility platform may be determined by taking into account parallax differences or other perceptual differences between the location of an object in an image captured on an level plane and the location of an object captured on a tilted plane (e.g., using a homomorphic transform or the like relative to a defined ground plane or other reference plane).

In some embodiments, threat detection engine 122 can use various techniques to adjust how inferencing is performed when collision threats are detected and when collision threats are not detected from the image data 212 and range data 217. When threat detection engine 122 has not detected a threat in image data 212 and range data 217, a pruned or quantized version of object detection model 222 and models used by path predictor 224 may be used to analyze the image data 212 and range data 217 for a potential threat in the next inferencing round. When threat detection engine 122 has detected a threat in image data 212 and range data 217, threat detection engine 122 can use a non-pruned and higher precision version of object detection model 222 and models used by path predictor 224 to analyze the image data 212 and range data 217 for a potential threat in the next inferencing round.

Alerting engine 124 uses the identification of threats generated by threat detection engine 122 to generate alert data 226 for output to an output device 230. Generally, alerting engine 124 can use the identification of an object in image data 212, location, range, and velocity data derived from range data 217, and the predicted path of an object to generate an alert to a user of the micromobility platform. In some embodiments, alert data 226 may be generated as data used to render an image of an approaching threat to the micromobility on a display associated with output device 230. For example, the data may include information identifying a sprite to use in presenting information about the object that has been determined to be a potential threat to the micromobility platform (e.g., such that cars are represented by a car sprite, trucks are represented by a truck sprite, etc.), a location of the object relative to the micromobility platform, etc. In some embodiments, the alert data 226 may include a predicted path of travel that can be rendered on output device 230 and an indication of a severity of the threat. Output device 230 may, for example, be configured to render information about a threat using different colors or patterning based on how severe or imminent of a collision threat path predictor 224 has determined the object to be. Objects determined to be a severe or imminent collision threat may be rendered on output device 230 in a first color or pattern (e.g., flashing red, etc.), while less severe or imminent collision threats may be rendered on output device 230 using different colors or patterns.

In some embodiments, output device 230 may be an augmented reality device, such as augmented reality glasses or an augmented reality helmet, in which images may be overlaid on a view of the environment the user is viewing through the augmented reality device. Various alerts may be rendered on the augmented reality device, such as an indication that an object is closing in distance and a relative location of the object to the micromobility platform. In some embodiments, a virtual rearview mirror may be rendered on output device 230. In such a case, alerting engine 124 can generate alert data 226 that instructs output device 230 to identify objects that are potential collision threats to the micromobility platform in the virtual rearview mirror rendered on output device 230.

In some embodiments, alerting engine 124 can generate alert data 226 in non-visual modalities. For example, alerting engine 124 can generate an audio alert that is transmitted to an output device 230 for audio playback to a user of the micromobility platform. The audio alert may, for example, be spatially aware, such that alerts for objects approaching on the left side of the micromobility platform are played on a left audio output channel and alerts for objects approaching on the right side of the micromobility platform are played on a right audio output channel of output device 230. In some embodiments, alerting engine 124 can generate alert data 226 instructing output device 230 to deliver haptic feedback to a user of the micromobility platform. The haptic feedback may, for example, be delivered as a vibration, a tap, or other feedback at a location associated with the location of an object that is determined to be a potential collision threat to the micromobility platform.

In some embodiments, output device 230 may be a device that is configured to deliver information to operators of vehicles determined to be a potential collision threat to the micromobility platform, such as a light or array of lights mounted on the micromobility platform and visible to operators of other vehicles. The alert data 226 may, for example, instruct output device 230 to generate a light pattern for display to an operator of a vehicle determined to be a potential collision threat to the micromobility platform. For example, the alert data 226 can instruct output device 230 to display different light patterns based on a range and severity of a potential threat to the micromobility platform, with brighter lights and more rapid patterns being displayed to more severe or imminent threats to the micromobility platform.

Of course, it should be recognized that the foregoing are but examples of alert data 226 that can be generated by alerting engine 124 and transmitted to output device 230 for presentation to a user of the micromobility platform, and alert data 226 triggering the presentation of other types of alerts may be contemplated.

In some embodiments, recording engine 228 may be instructed to begin recording data related to potential collision threats to the micromobility platform when path predictor 224 determines that an object is a potential collision threat. The image data 212 and/or range data 217 may be recorded as recorded data 229 at a high resolution and periodicity and committed to storage 240. In some embodiments, storage 240 may be local storage located in the same physical package as processing system 220. In some embodiments, storage 240 may be a cloud or other remote storage destination accessible via a network connection between processing system 220 and a computing device on which storage 240 is located. Generally, recording engine 228 may commit recorded data 229 from imaging device 210 and/or ranging device 215 starting from a time at which an object is determined to be a potential collision threat to the micromobility platform and ending based on a time at which the object is determined to no longer be a potential collision threat to the micromobility platform. For example, when an object is no longer detected in the image data 212, recording engine 228 can receive a signal from threat detection engine 122 indicating that the object is no longer a potential collision threat. Recording engine 228 can continue recording for a threshold amount of time after receiving the signal. In some embodiments, if recording engine 228 receives a signal within the threshold amount of time indicating that a new threat has been detected, the timer associated with the threshold amount of time may be cancelled. Recording engine 228 can continue recording until a new signal is received indicating that the object is no longer a potential collision threat to the micromobility platform.

Figure 3:
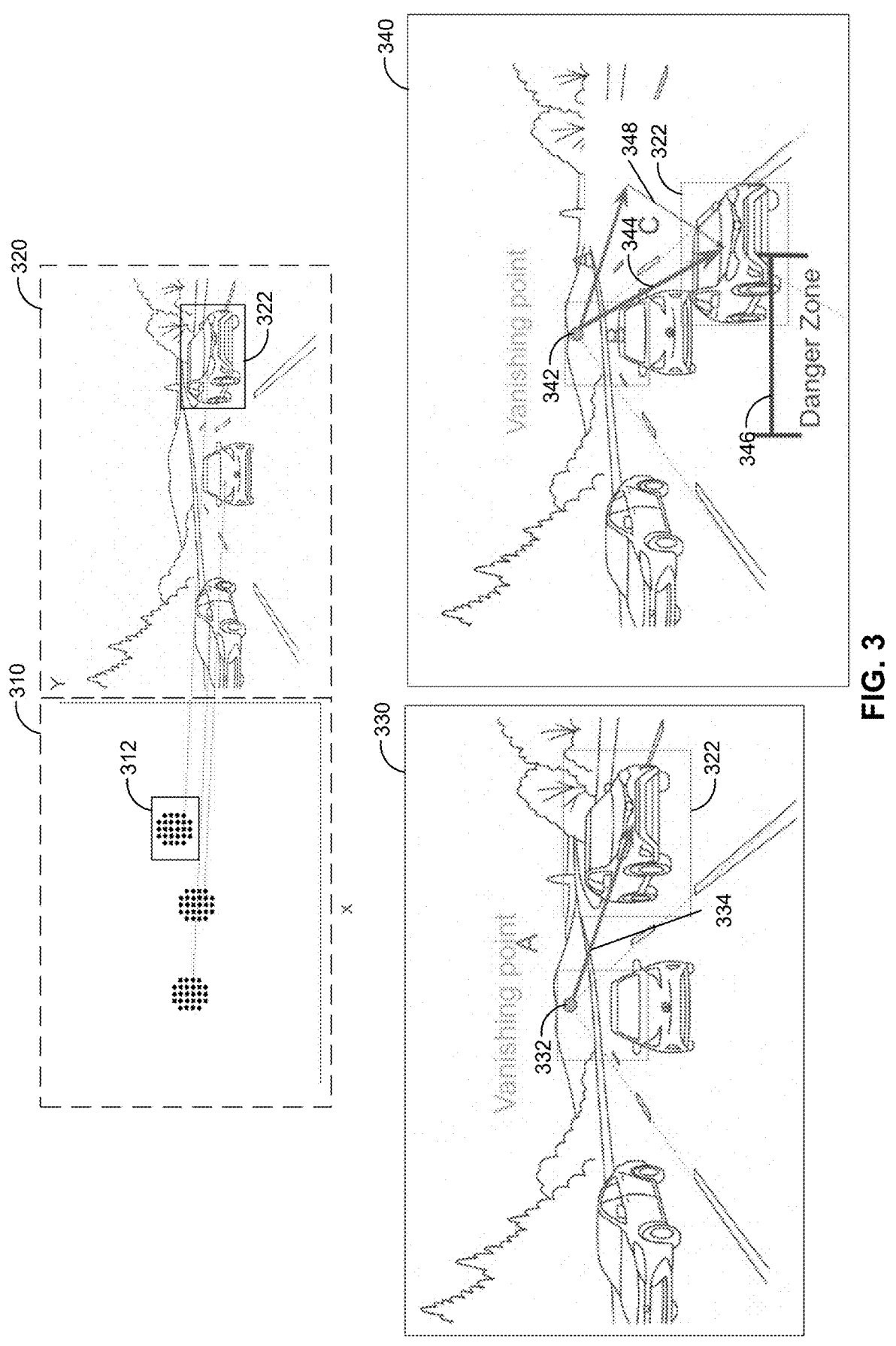
FIG. 3 illustrates an example of efficient threat detection for micromobility platforms based on a fusion of imaging and ranging data, according to some embodiments.

FIG. 3 illustrates an example of efficient threat detection for micromobility platforms based on a fusion of imaging and ranging data, according to some embodiments.

As illustrated, range data 310 and corresponding image data 320 may be received from a ranging device (e.g., ranging device 215 illustrated in FIG. 2) and an imaging device (e.g., imaging device 210 illustrated in FIG. 2), respectively. The image data 320 may be processed by an object detection model (e.g., object detection model 222 illustrated in FIG. 2) to identify an object of interest in the image data 320, such as the vehicle 322 in image data 320. To determine the distance of the vehicle 322 from the micromobility platform, a threat detection engine can attempt to match clusters of points in the range data 310 to objects in the image data 320 based on a combinatorial algorithm that attempts to match unique point clusters in the range data 310 to unique objects in the image data 320. In the example illustrated in FIG. 3, using a combinatorial algorithm such as a Hungarian matching algorithm, the threat detection engine 122 can match the point cluster 312 to the vehicle 322. Based on the distance from the reference plane of the points in point cluster 312, the threat detection engine can determine whether the vehicle 322 is a potential threat to the micromobility platform; if so, in some embodiments, the threat detection engine can proceed to determine a path of travel of the vehicle 322 to confirm that the vehicle 322 is a collision threat to the micromobility platform.

To determine the path of travel of the vehicle 322 relative to the micromobility platform, a path predictor (e.g., path predictor 224 illustrated in FIG. 2) can identify a reference point, or vanishing point, 332 based on which the path of travel of the vehicle 322 can be calculated. The vanishing point 332 may be a point at which parallel lines on the road (e.g., broken or solid road lines) converge in the image data 320, as vertical lines tend to be spaced wider from each other when closer to the imaging device capturing image data 320 and move closer to each other as the vertical lines move further away from the imaging device. In frame 330, a first vector 334 may be generated with the vanishing point 332 as a starting point and a defined point in a bounding box associated with vehicle 322 as a terminating point of the first vector 334.

Similarly, in frame 340, the vanishing point 342 identified for this frame may be used to generate a second vector 344 associated with the vehicle 322 at its new position in frame 340 (relative to its position in frame 330). In this example, the origin point of the second vector 344 may be the vanishing point 342 identified for frame 340, and the terminating point of the second vector 344 may be a defined point in a bounding box associated with vehicle 322.

To determine whether the vehicle 322 is a potential collision threat to the micromobility platform, a danger zone 346 may be defined as a horizontal range in the frame 340. In some embodiments, objects with vectors terminating at a horizontal datum point within the danger zone 346 may be determined to be potential collision threats to the micromobility platform, while objects with vectors terminating at a horizontal datum point outside the danger zone 346 may be determined to not be potential collision threats to the micromobility platform. In the example illustrated in FIG. 3, because the terminating point of vector 344 has a horizontal datum point that is within the horizontal boundaries defined for danger zone 346, vehicle 322 may be determined to be a potential collision threat to the micromobility platform. In some embodiments, a vector 348 may be drawn with an originating point at the terminating point of vector 334 and a terminating point at the terminating point of vector 344. If the vector 348 points towards a spot within danger zone 346, the vehicle 322 may be determined to be a potential collision threat to the micromobility platform. Based on this determination, imaging devices may be switched to higher resolution image capture modes, imaging and ranging data may be recorded, and one or more alerts may be delivered to a user of the micromobility platform indicating that an object is a potential collision threat to the micromobility platform.

FIG. 4 illustrates example operations 400 for efficiently detecting threats to a micromobility platform based on a fusion of imaging and ranging data, according to some embodiments. Operations 400 may be performed by a computing device on which imaging and ranging data can be received and processed to determine whether an object is a potential collision threat to a micromobility platform, such as a computing device 100 illustrated in FIG. 1, a processing system 220 illustrated in FIG. 2, or the like.

As illustrated, operations 400 begin at block 410, with the computing system capturing image data from a first sensor and corresponding ranging data from a second sensor communicatively coupled with a processing system. Generally, the first sensor, the second sensor, and the processing system may be mounted (e.g., detachably or permanently) on a micromobility platform. In some embodiments, the first sensor may be an imaging sensor and the second sensor may be a millimeter wave radar or other ranging device (e.g., LiDAR, ultrasonic sensors, etc.).

At block 420, operations 400 proceed with the computing system identifying, based on an object detection machine learning model and the image data, one or more objects to monitor.

In some embodiments, the object detection model may be a model trained to classify objects in the image data into different types of vehicles and disregard objects that are not likely to be a collision threat to the micromobility platform. For example, the object detection model may be trained to recognize different types of motorized road vehicles, such as passenger cars, sport utility vehicles, light-duty trucks, heavier-duty trucks, tractor-trailer trucks, two-wheeled or three-wheeled motorcycles, or the like. The object detection model may not be trained to recognize airborne objects, such as birds, drones, aeroplanes, or the like.

At block 430, operations 400 proceed with the computing system predicting, based on processing the image data and the corresponding ranging data through a machine learning model, future motion of the identified one or more objects.

In some embodiments, the predicted future motion of the threatening object comprises a predicted path and velocity of the threatening object.

At block 440, operations 400 proceed with the computing system determining, based on the predicted future motion of the identified one or more objects and a type of the identified one or more objects, that a threatening object from the identified one or more objects is a collision threat to the micromobility platform.

In some embodiments, determining that the threatening object is a collision threat to the micromobility platform may include comparing a predicted future location of the threatening object, determined based on the predicted future motion of the threatening object, to a predicted future location of the micromobility platform. The threatening object may be determined to be a collision threat when the predicted future location of the threatening object is within a threshold location of the predicted future location of the micromobility platform. In some embodiments, the predicted future location of the threating object may be a reference plane defined for the micromobility platform, and the predicted future location of the threating object may have a distance component away from the reference plane and a horizontal component relative to a field of view of the imaging device on which the image data was captured. If the threating object is within a range of horizontal data points associated with a defined danger zone, the threatening object may be determined to be a potential collision threat.

In some embodiments, the threshold location may be defined as a specified distance from the micromobility platform and a lateral range in which a vector from a defined point in the image data points. The defined point may, for example, be a vanishing point in the image data in which vertical lines converge.

In some embodiments, the predicted future location of the threatening object may be determined based on a vector generated using the defined point and a point in a bounding box associated with the threatening object. If the distance of the threatening object from the reference plane defined for the micromobility platform is within a threshold distance and the horizontal component of the vector is within the horizontal range of a defined danger zone, the predicted future location of the threatening object may be determined to be within a threshold location of the predicted future location of the micromobility platform.

At block 450, operations 400 proceed with recording subsequent image data from the first sensor based on the determination until a threshold amount of time after which the machine learning model determines that the threatening object is no longer a collision threat has elapsed. In some embodiments, the captured image data is captured at lower resolution and periodicity than the subsequent image data. For example, the captured image data may be captured at 720p resolution and at a periodicity of 10 frames per second, while the subsequent image data recorded from the first sensor may be captured at 1080p resolution and at a periodicity of at least 30 frames per second (though it should recognized that this is merely an illustrative example of the frame rates and resolutions at which the captured image data and the subsequent image data is captured).

In some embodiments, operations 400 further include transmitting, to a display device communicatively coupled with the processing system, information about the threatening object for display on the display device. The information may include, for example, an indication of a type of the threatening object, a velocity delta between the threatening object and the micromobility platform, and a predicted path or predicted future location of the threatening object. In some embodiments, the display device may be a smartphone. In some embodiments, the display device may be an augmented reality display.

In some embodiments, operations 400 further include activating one or more signaling lights displaying an alert to the threatening object based on determining that the threatening object is a collision threat.

In some embodiments, operations 400 further include determining a tilt angle of the micromobility platform relative to a reference plane and determining a relative position of the threatening object and the micromobility platform based on the tilt angle. By doing so, the computing system can compensate for parallax differences and other perceptual differences between images captured on a level plane versus images captured on a tilted plane.

One technical advantage of the disclosed techniques relative to the prior art is that the disclosed techniques are operable to efficiently identify potential threats to a micromobility platform and perform various downstream recording and notification tasks to provide situational awareness to users of a micromobility platform and/or operators of other vehicles in the vicinity of the micromobility platform. Because embodiments presented herein fuse image and range data to determine whether an object is a potential collision threat to a micromobility platform, embodiments of the present disclosure may provide finer-grained detail about the environment in which a micromobility platform is operating to a user of the micromobility platform relative to devices in which a single modality of data is used to detect potential threats to the micromobility platform. Further, because threat detection and prediction can be used to adjust the periodicity and resolution of captured input data used to determine whether an object is a potential threat to the micromobility platform, embodiments of the present disclosure may allow for the identification of potential threats to a micromobility platform using computationally efficient techniques. These technical advantages provide one or more improvements over prior art approaches.

Example Clauses

Implementation details of various aspects of the present disclosure are described in the following numbered clauses:

1. In some embodiments, a computer-implemented method comprises capturing image data from a first sensor and corresponding ranging data from a second sensor communicatively coupled with a processing system, the first sensor, the second sensor, and the processing system being mounted on a micromobility platform; identifying, based on an object detection machine learning model and the image data, one or more objects to monitor; predicting, based on processing the image data and the corresponding ranging data through a machine learning model, future motion of the identified one or more objects; determining, based on the predicted future motion of the identified one or more objects and a type of the identified one or more objects, that a threatening object from the identified one or more objects is a collision threat to the micromobility platform; and recording subsequent image data from the first sensor based on the determination until a threshold amount of time after which the machine learning model determines that the threatening object is no longer a collision threat has elapsed.

2. The method of clause 1, wherein the captured image data is captured at a lower resolution and periodicity than the subsequent image data.

3. The method of any of clauses 1 or 2, wherein the object detection machine learning model is trained to classify objects in the image data into different types of vehicles and disregard objects that are not likely to be a collision threat to the micromobility platform.

4. The method of any of clauses 1 through 3, wherein determining that the threatening object is a collision threat comprises: comparing a predicted future location of the threatening object, determined based on the predicted future motion of the threatening object, to a predicted future location of the micromobility platform; and determining that the threatening object is a collision threat when the predicted future location of the threatening object is within a threshold location of the predicted future location of the micromobility platform.

5. The method of clause 4, wherein the threshold location comprises a specified distance from the micromobility platform and a lateral range in which a vector from a defined point in the image data points.

6. The method of clause 5, wherein the defined point comprises a vanishing point in the image data in which lines converge.

7. The method of any of clauses 1 through 6, further comprising transmitting, to a display device communicatively coupled with the processing system, information about the threatening object for display on the display device.

8. The method of clause 7, wherein the information comprises an indication of a type of the threatening object, a velocity delta between the threatening object and the micromobility platform, and a predicted path of the threatening object.

9. The method of any of clauses 7 or 8, wherein the display device comprises a smartphone.

10. The method of any of clauses 7 through 9, wherein the display device comprises an augmented reality display.

11. The method of any of clauses 1 through 10, wherein the predicted future motion of the threatening object comprises a predicted path and velocity of the threatening object.

12. The method of any of clauses 1 through 11, further comprising activating one or more signaling lights displaying an alert to the threatening object based on determining that the threatening object is a collision threat.

13. The method of any of clauses 1 through 12, wherein the first sensor comprises an imaging sensor and the second sensor comprises a millimeter wave radar.

14. The method of any of clauses 1 through 13, further comprising: determining a tilt angle of the micromobility platform relative to a reference plane; and determining a relative position of the threatening object and the micromobility platform based on the tilt angle.

15. A processing system, comprising: at least one memory having executable instructions stored thereon; and one or more processors configured to execute the executable instructions to cause the processing system to perform the operations of any of clauses 1 through 14.

16. A processing system, comprising: means for performing the operations of any of clauses 1 through 14.

17. A non-transitory computer-readable medium having executable instruction stored thereon which, when executed by one or more processors, performs the operations of any of clauses 1 through 14.

Any and all combinations of any of the claim elements recited in any of the claims and/or any elements described in this application, in any fashion, fall within the contemplated scope of the present invention and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A processor-implemented method, comprising:

capturing image data from a first sensor and corresponding ranging data from a second sensor communicatively coupled with a processing system, the first sensor, the second sensor, and the processing system being mounted on a micromobility platform;

identifying, based on an object detection machine learning model and the image data, one or more objects to monitor;

predicting, based on processing the image data and the corresponding ranging data through a machine learning model, future motion of the identified one or more objects;

determining, based on the predicted future motion of the identified one or more objects and a type of the identified one or more objects, that a threatening object from the identified one or more objects is a collision threat to the micromobility platform, wherein determining that the threating object is a collision threat comprises:

comparing a predicted future location of the threatening object, determined based on the predicted future motion of the threatening object, to a predicted future location of the micromobility platform, determining that the threatening object is a collision threat when the predicted future location of the threatening object is within a threshold location of the predicted future location of the micromobility platform, and the threshold location comprises a specified distance from the micromobility platform and a lateral range in which a vector points, the vector starting at a prior location associated with the threatening object in the image data and ending at a current location associated with the threatening object in the image data; and recording subsequent image data from the first sensor based on the determination until a threshold amount of time after which the machine learning model determines that the threatening object is no longer a collision threat has elapsed.

2. The method of claim 1, wherein the captured image data is captured at a lower resolution and periodicity than the subsequent image data.

3. The method of claim 1, wherein the object detection machine learning model is trained to classify objects in the image data into different types of vehicles and disregard objects that are not likely to be a collision threat to the micromobility platform.

4. The method of claim 1, wherein the defined point comprises a vanishing point in the image data in which lines converge.

5. The method of claim 1, further comprising transmitting, to a display device communicatively coupled with the processing system, information about the threatening object for display on the display device.

6. The method of claim 5, wherein the information comprises an indication of a type of the threatening object, a velocity delta between the threatening object and the micromobility platform, and a predicted path of the threatening object.

7. The method of claim 5, wherein the display device comprises a smartphone.

8. The method of claim 5, wherein the display device comprises an augmented reality display.

9. The method of claim 1, wherein the predicted future motion of the threatening object comprises a predicted path and velocity of the threatening object.

10. The method of claim 1, further comprising activating one or more signaling lights displaying an alert to the threatening object based on determining that the threatening object is a collision threat.

11. The method of claim 1, wherein the first sensor comprises an imaging sensor and the second sensor comprises a millimeter wave radar.

12. The method of claim 1, further comprising:

determining a tilt angle of the micromobility platform relative to a reference plane; and determining a relative position of the threatening object and the micromobility platform based on the tilt angle.

13. A system for detecting collision threats on a micromobility platform, comprising:

an imaging device mounted on a micromobility platform;

a ranging device mounted on the micromobility platform; and a processing system communicatively coupled with the imaging device and the ranging device and having a memory with executable instructions stored thereon and one or more processors configured to execute the executable instructions to cause the processing system to:

capture image data from the imaging device and corresponding ranging data from the ranging device;

identify, based on an object detection machine learning model and the image data, one or more objects to monitor;

predict, based on processing the image data and the corresponding ranging data through a machine learning model, future motion of the identified one or more objects;

determine, based on the predicted future motion of the identified one or more objects and a type of the identified one or more objects, that a threatening object from the identified one or more objects is a collision threat to the micromobility platform, wherein to determine that the threating object is a collision threat, the one or more processors are configured to cause the processing system to:

compare a predicted future location of the threatening object, determined based on the predicted future motion of the threatening object, to a predicted future location of the micromobility platform, determine that the threatening object is a collision threat when the predicted future location of the threatening object is within a threshold location of the predicted future location of the micromobility platform, and the threshold location comprises a specified distance from the micromobility platform and a lateral range in which a vector points, the vector starting at a prior location associated with the threatening object in the image data and ending at a current location associated with the threatening object in the image data; and record subsequent image data from the imaging device based on the determination until a threshold amount of time after which the machine learning model determines that the threatening object is no longer a collision threat has elapsed.

14. The system of claim 13, wherein the captured image data is captured at a lower resolution and periodicity than the subsequent image data.

15. The system of claim 13, wherein the one or more processors are further configured to cause the processing system to transmit, to a display device communicatively coupled with the processing system, information about the threatening object for display on the display device.

16. The system of claim 13, wherein the predicted future motion of the threatening object comprises a predicted path and velocity of the threatening object.

17. A non-transitory computer-readable medium having executable instructions stored thereon which, when executed by one or more processors, causes the one or more processors to perform an operation comprising:

capturing image data from a first sensor and corresponding ranging data from a second sensor communicatively coupled with a processing system, the first sensor, the second sensor, and the processing system being mounted on a micromobility platform;

identifying, based on an object detection machine learning model and the image data, one or more objects to monitor;

predicting, based on processing the image data and the corresponding ranging data through a machine learning model, future motion of the identified one or more objects;

determining, based on the predicted future motion of the identified one or more objects and a type of the identified one or more objects, that a threatening object from the identified one or more objects is a collision threat to the micromobility platform, wherein determining that the threating object is a collision threat comprises:

comparing a predicted future location of the threatening object, determined based on the predicted future motion of the threatening object, to a predicted future location of the micromobility platform, determining that the threatening object is a collision threat when the predicted future location of the threatening object is within a threshold location of the predicted future location of the micromobility platform, and the threshold location comprises a specified distance from the micromobility platform and a lateral range in which a vector points, the vector starting at a prior location associated with the threatening object in the image data and ending at a current location associated with the threatening object in the image data; and recording subsequent image data from the first sensor based on the determination until a threshold amount of time after which the machine learning model determines that the threatening object is no longer a collision threat has elapsed.

* * * * *